May 22, 1928.
H. J. McCUE
BEVERAGE DISPENSER
Filed April 9, 1927
1,670,373
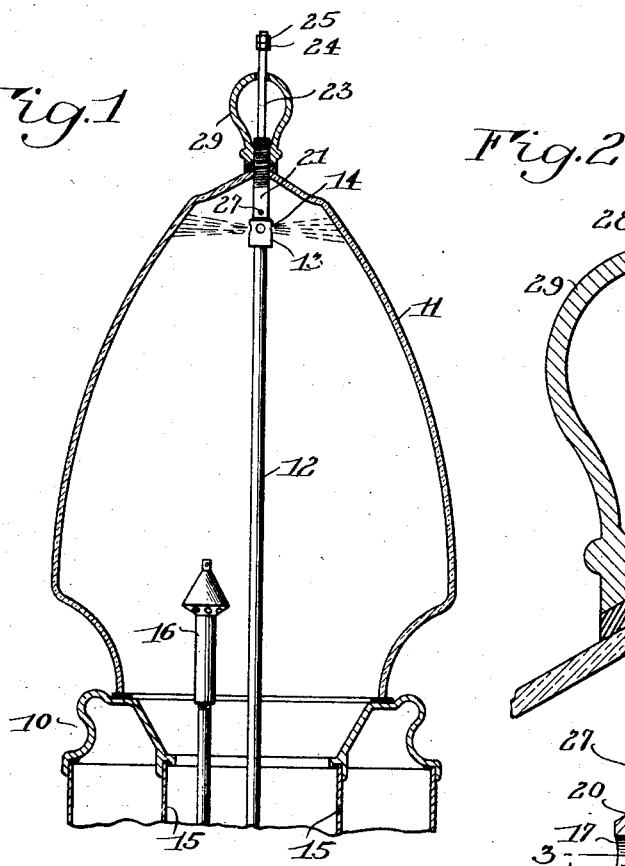
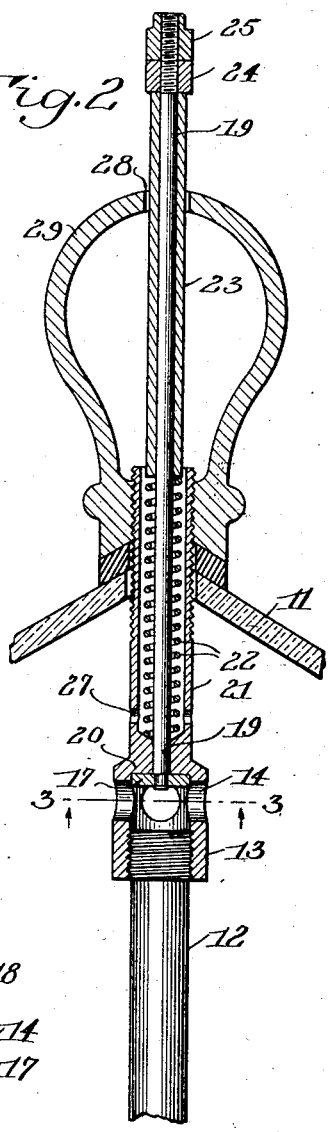
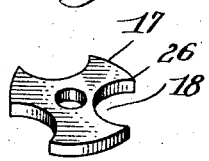
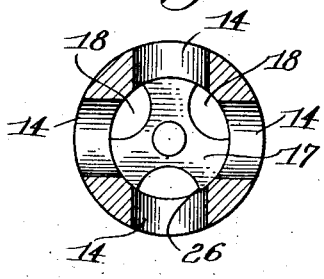
INVENTOR
Harry J. McCue
Harold E. Stonebraker
his ATTORNEY Patented May 22, 1928.

1,670,373

UNITED STATES PATENT OFFICE.

HARRY J. McCUE, OF CLEVELAND, OHIO, ASSIGNOR TO RICHARDSON CORPORATION, OF ROCHESTER, NEW YORK, A CORPORATION OF NEW YORK.

BEVERAGE DISPENSER.

Application filed April 9, 1927. Serial No. 182,402.

This invention relates to a beverage dispenser, particularly of the type in which the beverage is discharged from a conduit within an inverted bowl, dispensers of this kind being shown in the patent to Humphrey, No. 1,546,733, July 21, 1925, and in my application Serial No. 173,167, filed March 5, 1927.

In dispensers of this general type, the beverage flowing through the conduit often contains more or less solid matter such as orange pulp, shredded pineapple, crushed strawberries, or other kinds of fruit or other food matter. It is found in use that the pulp or crushed fruit clogs up the openings through which the beverage is discharged from the conduit.

The principal object of the present invention is to provide mechanism for cleaning out the conduit and discharge openings and removing the accumulation of pulp or other material which becomes lodged therein.

Another object is to provide a device of this nature which can be easily manipulated by the operator, whenever desired, and which is applicable to beverage dispensers already in use.

A further object is to provide a simple and efficient construction of few parts, easy and cheap to manufacture, and which is not liable to get out of order.

With these and other ends in view, the invention comprises the structure and combination of parts which will appear more clearly from the following description when read in conjunction with the accompanying drawings, the novel features being pointed out in the claims following the description.

In the drawings:

Figure 1 is a vertical section through the top of a beverage dispenser showing a preferred embodiment of my invention;

Figure 2 is an enlarged detail view of the upper part of Figure 1 showing the parts in section;

Figure 3 is a transverse section on the line 3—3 of Figure 2, and

Figure 4 is a perspective view of a portion of the device.

As is usual in dispensing apparatus of this general type, a base 10 is provided on which is mounted an inverted bowl-like member 11. This member is preferably but not necessarily transparent. Mounted within the base and extending up inside the bowl-like member is a conduit 12 having a fitting 13 at the top thereof, this fitting having a chamber which forms an extension of the conduit. The fitting 13 contains a series of circumferentially spaced discharge openings 14. In operation, the beverage is forced upward through the conduit 12 and out through the openings 14, impinging against the bowl-like 11 and running down the sides thereof. If the member 11 is transparent, this flow may be observed and forms an attractive advertising display. The beverage after flowing down the sides of the member 11 collects within a chamber formed by walls 15 within the base 10, and is drawn off therefrom through faucets or other suitable means as desired. If the beverage is not drawn off as fast as it is supplied from the conduit 12, it may collect in the chamber and in the lower part of the inverted bowl-like member 11 until it reaches the level of an overflow pipe 16, by means of which the excess beverage is returned to the main supply tank.

Dispensing apparatus of this type is widely used for orangeade, and other fruit beverage containing various crushed or shredded fruits or fruit pulp. When beverages of this kind are forced through the conduit 12, clogging of the discharge openings 14 frequently occurs, as the solid matter in the beverage is very apt to lodge at the end of the conduit 12 adjacent the discharge openings, and in these openings themselves.

To remedy this condition, I provide a cleaning member which preferably is in the form of a plunger or disk 17 having substantially the same diameter as the inside diameter of the upper end of the conduit. Cut-out portions 18 are formed in the periphery of the cleaning member. It will be noted from Figure 3 that the circumferential spacing of these cut-out portions is different from the circumferential spacing of the outlet openings 14. Thus there are three cut-out portion while four outlet openings are provided.

The cleaning member is movable in the conduit, preferably as in the present embodiment, having both rotary and longitudinal movement, and to this end is provided with an actuating member or handle 19 secured to the cleaning member 17 and extending through an opening in the end wall 20 of the conduit. This actuating member passes upwardly through the top of the inverted bowl-like member 11. Attached to the end wall 20 of the conduit and extending upward through the member 11 and around the handle 19, is a sleeve 21. Within this sleeve and surrounding the actuating member 19 is a coil spring 22. The bottom of this spring rests upon the end wall of the conduit while the top presses against a sleeve 23 on the actuating member 19, held in place by lock-nuts 24 and 25 screwed on the end of said actuating member. Thus the spring forms a resilient means tending to force the actuating member 19 upward and to keep the cleaning member or plunger 17 against the end wall of the conduit.

When the discharge end of the conduit becomes clogged it may be cleaned easily by moving the actuating member 19 up and down and if necessary giving it a rotation at the same time. Due to the cut-out portions in the cleaning member, sharp corners 26 are formed thereon, as plainly shown in Figures 3 and 4, and these quickly cut out and remove the accumulated pulp or other material when the member is rotated. The up-and-down movement of the cleaning member brings it into operative relation with different portions of the end of the conduit, thus thoroughly removing all the material which may become lodged in the conduit adjacent the discharge openings 14.

It is common in beverage dispensers of this type to provide a small vent through the inverted bowl-like member 11 so that a high pressure will not form therein. If desired, openings 27 may be formed for this purpose through the sleeve 21. Gases under pressure may escape from within the member 11 by passing through the openings 27, thence flowing upward between the sleeve 21 and the member 19, finally escaping into the atmosphere through the opening 28 in the cap member 29, which opening is somewhat larger than the diameter of the sleeve 23.

It will now be seen that I have disclosed, as one embodiment of my invention, a cleaning member which is rotatable as well as longitudinally movable within one end of the beverage supply conduit. The cleaning device may be operated by an actuating member which extends outside of the bowl-like member 11, and it is therefore unnecessary to dismantle the mechanism when the discharge openings become clogged.

To apply this form of my invention to beverage dispensers already in use, it is necessary only to remove the bowl-like member 11, take the fitting off the top of the conduit and substitute my fitting 13 and its associated parts therefor. A new bowl-like member 11 containing the proper openings for the actuating member and for the sleeve 21, is then put in place and the dispensing apparatus is again ready for use.

While I have disclosed one embodiment of my invention, it is to be understood that the inventive idea may be carried out in a number of ways. Therefore, I do not desire to be limited to the precise details shown, but this application is intended to cover all modifications thereof falling within the spirit of the invention or the scope of the appended claims.

I claim:

1. In a beverage dispenser, the combination with a conduit having discharge openings therein, of an inverted bowl-like member surrounding said conduit, a cleaning device movable within said conduit to dislodge material clogging said openings, and an actuating member connected to said cleaning device and extending through said bowl-like member so that said cleaning device may be actuated from without said bowl-like member.

2. In a beverage dispenser, the combination with a conduit having a series of circumferentially spaced outlet openings in the side walls thereof, of a plunger movable within said conduit past said openings, said plunger having cut-out portions in the periphery thereof, the circumferential spacing of said cut-out portions being different from the circumferential spacing of said outlet openings.

3. In a beverage dispenser, the combination with a conduit having discharge openings therein, of an inverted bowl-like member surrounding said conduit, a sleeve connected to the conduit and extending through said bowl-like member, a cap having engagement with the outer end of said sleeve for holding the latter in operative relation to the bowl-like member, a cleaning device movable within said conduit to dislodge material clogging said openings, an actuating member connected to the cleaning device and extending through the aforesaid sleeve and spaced therefrom, said actuating member extending exteriorly of the aforementioned cap where it is accessible for operating the cleaning device, and a spring surrounding the actuating member within said sleeve and located between the bottom of the sleeve and a stop on the actuating member, thereby acting to hold the cleaning device normally in its uppermost position.

In witness whereof, I have hereunto signed my name.

HARRY J. McCUE